(12) United States Patent
Manneschi

(10) Patent No.: US 9,726,778 B2
(45) Date of Patent: Aug. 8, 2017

(54) PORTABLE DETECTOR FOR METALS DETECTION INCLUDING AN ADVANCED SYSTEM FOR AUTOMATIC STANDBY

(71) Applicant: Costruzioni Elettroniche Industriali Automatismi S.p.A. C.E.I.A. S.P.A., Arezzo (IT)

(72) Inventor: Alessandro Manneschi, Arezzo (IT)

(73) Assignee: Costruzioni Elettroniche Industriali Automatismi S.p.A. C.E.I.A. S.P.A. (IT)

( * ) Notice: Subject to any disclaimer, the term of this patent is extended or adjusted under 35 U.S.C. 154(b) by 186 days.

(21) Appl. No.: 14/451,754

(22) Filed: Aug. 5, 2014

(65) Prior Publication Data
US 2015/0035525 A1     Feb. 5, 2015

(30) Foreign Application Priority Data
Aug. 5, 2013  (FR) .................................. 13 57787

(51) Int. Cl.
*G01R 33/02* (2006.01)
*G01V 3/10* (2006.01)
*G01V 3/15* (2006.01)

(52) U.S. Cl.
CPC ................ *G01V 3/102* (2013.01); *G01V 3/15* (2013.01)

(58) Field of Classification Search
CPC ... G01R 33/0047; G01S 13/88; G01S 13/887; G01V 3/081; G01V 3/10; G01V 3/12; G01V 3/101; G01V 3/102; G01V 3/104; G01V 3/105; G01V 3/15; G01V 3/165; G01V 3/17

USPC .......... 73/28.01, 864.33, 864; 324/228, 244, 324/260, 326, 327, 328, 329; 702/141, 702/150, 151, 152, 153, 154; 340/568.1, 340/686.1; 342/22; D10/75, 78

See application file for complete search history.

(56) References Cited

U.S. PATENT DOCUMENTS

| | | | |
|---|---|---|---|
| 5,959,451 A * | 9/1999 | De Torfino | G01V 3/15 324/236 |
| 7,296,683 B1 | 11/2007 | Vallelonga, Sr. et al. | |
| 7,755,360 B1 | 7/2010 | Martin | |
| 9,207,315 B1 * | 12/2015 | Plautz | G01S 13/885 |
| 2010/0085185 A1 * | 4/2010 | Nielsen | G01V 3/15 340/540 |
| 2010/0140062 A1 * | 6/2010 | Hopkins | D06F 75/26 200/61.45 R |

(Continued)

FOREIGN PATENT DOCUMENTS

WO     9927391 A1     6/1999

*Primary Examiner* — Arleen M Vazquez
*Assistant Examiner* — Steven Yeninas
(74) *Attorney, Agent, or Firm* — Lerner, David, Littenberg, Krumholz & Mentlik, LLP

(57) ABSTRACT

The present invention relates to a portable detector for metal detection, the detector including: a head extending longitudinally and comprising an inductive transducer for generating a magnetic field and measuring a variation in inductance, a body including a controller programmed to control the activation or the deactivation of a standby function of the detector, and a sensor for measuring one or more of the displacement of the detector or the orientation of the detector, wherein the controller controls the activation of the standby function as a function of signals received from the inductive transducer and from the sensor.

20 Claims, 2 Drawing Sheets

(56) References Cited

U.S. PATENT DOCUMENTS

Figure 1:
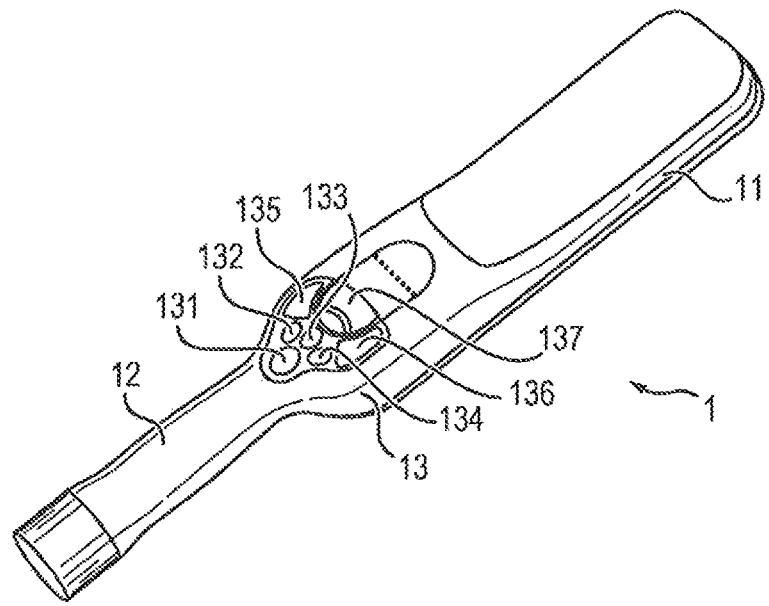

| | | |
|---|---|---|
| 2011/0260865 A1 | 10/2011 | Bergman et al. |
| 2014/0139213 A1* | 5/2014 | Cadugan ............ G01R 33/0023 |
| | | 324/251 |
| 2014/0218036 A1* | 8/2014 | Fry ........................ G01V 3/165 |
| | | 324/329 |
| 2015/0234079 A1* | 8/2015 | Loubet ..................... G01V 3/17 |
| | | 324/329 |

* cited by examiner

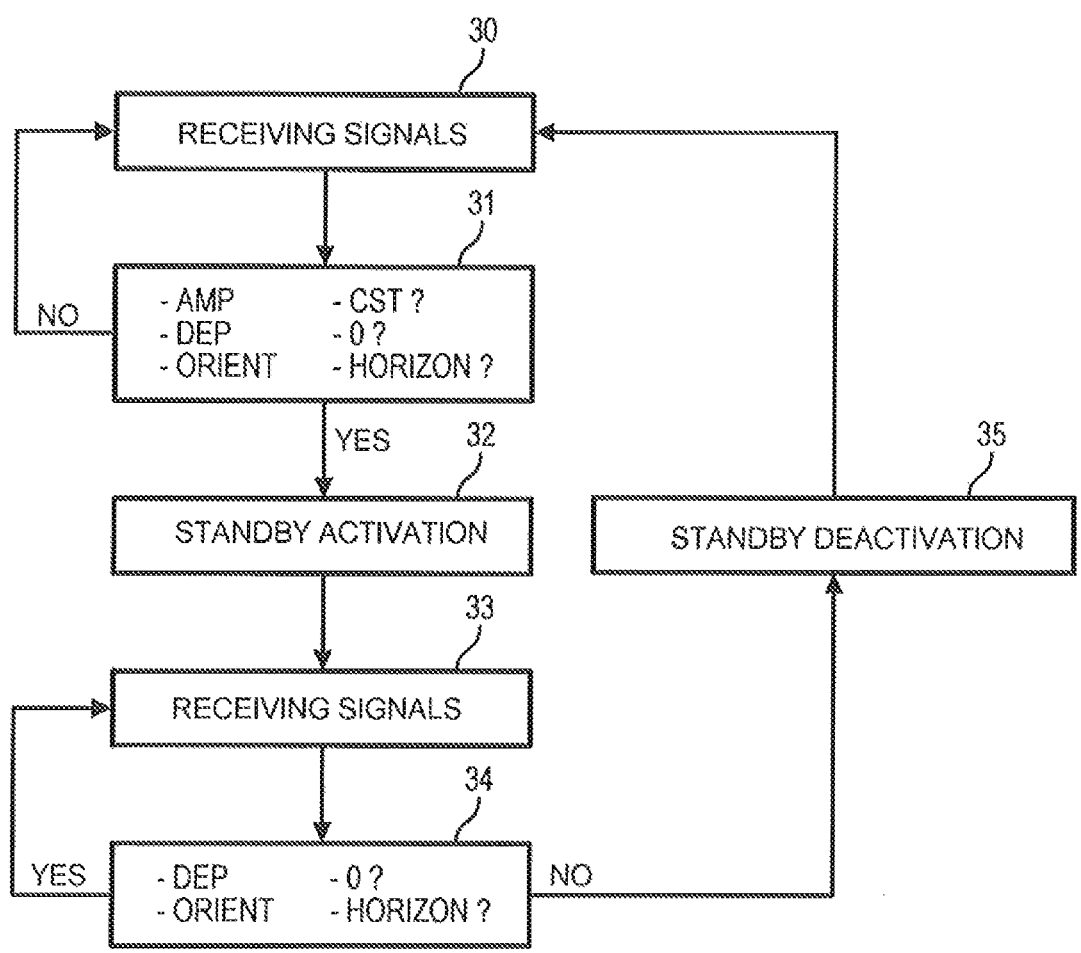

PORTABLE DETECTOR FOR METALS DETECTION INCLUDING AN ADVANCED SYSTEM FOR AUTOMATIC STANDBY

CROSS REFERENCE TO RELATED APPLICATIONS

The present application claims priority from French Patent Application No. 1357787, filed Aug. 5, 2013, the disclosure of which is incorporated by reference herein.

The present invention relates to the general technical field of portable detectors, especially for metals detection, for example during access to a departure lounge in an airport, or any other similar place of controlled access.

PRESENTATION OF PRIOR ART

Portable devices for metals detection are known, generally comprising:
 a handle for gripping of the device by an operator, the handle comprising an autonomous electric power source such as a fuel cell or a battery, and
 a head comprising:
  measuring means including an inductive transducer, such as a homopolar coil, for measuring the variation in its inductance and/or measuring parasite currents caused in the metals to be detected, and
  processing means including a microprocessor, such as an electronic card, for detecting the presence of metallic parts and sending an alert command to an alarm of the detector.

These detectors generally comprise a programmed standby function. When this standby function is active, the measuring means are made inactive, that is, they cease to put out any magnetic field. This limits the power consumption of the detector.

The standby function of the detector is generally activated if, after a given time period, the operator has not actioned a key of the detector.

To avoid the standby function activating during examination of a person before being controlled, this given time period is generally selected greater than or equal to ten minutes. This means that the detector emits waves over a time period greater than or equal to ten minutes.

Throughout the time period preceding standby of the detector, the operator must therefore keep the detector at a distance:
 from other devices whereof operation is likely to be altered by waves emitted by the detector,
 from any metallic material to avoid the detector from emitting an accidental continuous audio alarm.

In fact, in the event where the operator is forced by the operational circumstances to place the detector on a surface containing metals, the detector emits a continuous alarm and, consequently, can no longer switch to a monitoring state.

There is therefore a need for a novel portable detector in which a standby function of the detector can be activated more quickly than in portable detectors of the prior art, ensuring that this standby function is not activated during examination of a person to be checked.

PRESENTATION OF THE INVENTION

In this respect, the invention proposes a portable detector for metal detection, the detector including:
 a head extending longitudinally and comprising an inductive transducer for measuring a variation in its inductance and/or for measuring parasite currents caused in the metals to be detected, and
 a body including a controller programmed to control the activation or deactivation of a standby function of the detector,
note that the detector also comprises a sensor for measuring displacement of the detector, and/or for measuring orientation of the detector, the controller controlling activation of the standby function as a function of signals received:
 from the inductive transducer on the one hand, and
 from the sensor on the other hand.

In this way, the standby function of the detector can be activated faster than with the portable detectors of the prior art.

This limits the risk of perturbations and electromagnetic interference generated by the detector when the inductive transducer of the latter emits electromagnetic waves.

This also improves the energy yield of the detector by limiting the electrical energy consumed because of emission of electromagnetic waves by the inductive transducer when the detector is not used.

This finally makes for easier use of the detector by the operator, the latter not being obliged to hold the detector out of range of metallic parts or other devices for a long duration preceding standby of the detector.

Preferred though non-limiting aspects of the system according to the invention are the following:
 the controller controls activation of the standby function if the following conditions are verified:
  amplitude of the signal measured by the inductive transducer is constant over a predetermined time period, and
  displacement value of the signal measured by the sensor is zero;
 the controller controls activation of the standby function if the following conditions are verified:
  amplitude of the signal measured by the inductive transducer is constant over a predetermined time period, and
  the orientation value of the signal measured by the sensor is constant;
 the controller controls activation of the standby function if the following conditions are verified:
  amplitude of the signal measured by the inductive transducer is constant over a predetermined time period, and
  the displacement value of the signal measured by the sensor is zero, et
  the orientation value of the signal measured by the sensor is constant;
 the controller controls activation of the standby function if the orientation value is such that the head of the detector extends in a horizontal plane;
 the sensor is a three-axle accelerometer;
 the controller controls deactivation of the standby function as a function of the signals received from the sensor;
 the controller controls deactivation of the standby function if at least one of the following conditions is verified:
  the displacement value of the detector varies over a given time interval, and/or
  the orientation value of the signal measured by the sensor varies over the given time interval;

the controller controls deactivation of the standby function if the orientation value of the signal measured by the sensor is different to a reference orientation value in which the head of the detector extends in a horizontal plane.

PRESENTATION OF FIGURES

Figure 2:
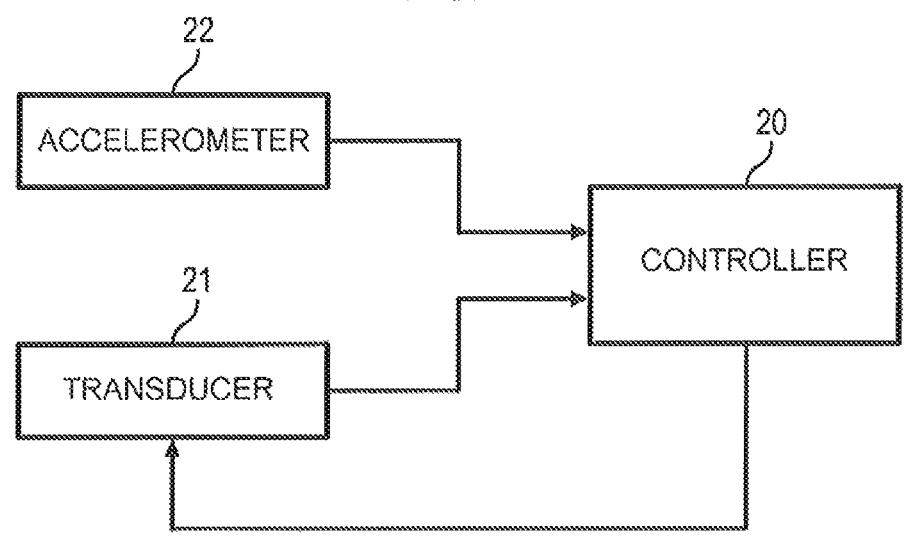

Other characteristics, aims and advantages of the present invention will emerge from the following description which is purely illustrative and non-limiting and must be considered with respect to the attached diagrams, in which:

FIG. 1 illustrates an example of a portable detector,

FIG. 2 schematically illustrates elements of the portable detector,

FIG. 3 is a block diagram of steps prior to standby of the portable detector.

DETAILED DESCRIPTION

An example of a portable detector according to the invention will now be described in more detail in reference to the figures. In these different figures, equivalent elements bear the same reference numerals.

1. Detector

In reference to FIG. 1, this illustrates an example of a detector 1 according to the invention. The detector comprises a head 11, a handle 12 and a body 13 between the head 11 and the handle 12.

1.1. Head

The head 11 of the detector comprises an inductive transducer 21 for measuring inductance generated. The inductive transducer 21 generates a magnetic field. It can comprise one or more windings well known to those skilled in the art.

In an embodiment, the inductive transducer 21 is formed by a single winding constituting transmitter and receiver.

In another embodiment, the transducer 21 is formed by two windings forming respectively, and where appropriate alternatively, transmitter and receiver.

In all cases, the windings preferably comprise several loops in series of inverse directions for neutralising the effects of external parasites.

Also, the inductive transducer 21 can advantageously comprise windings offset to each other, both at the level of emission and receiving, to limit the mutual inductance generated by the windings of the inductive transducer 21.

Of course, the number of transmitter windings and the number of receiver windings is not limited to one or two. Also, the number of transmitter windings is not necessarily identical to the number of receiver windings.

1.2. Handle

The handle 12 comprises a tube forming gripping means of the detector 1. The tube is hollow to let it house a battery of the detector. The hollow tube is open at its end opposite the head to enable introduction/withdrawal of the batter (not shown).

The handle 12 also comprises a removable cover at its free end to cap the opening of the hollow tube. The cover is fixed to the hollow tube by screwing, clipping or any other fastening element known to those skilled in the art.

In the embodiment illustrated in FIG. 1, the cover comprises a circular plaque and a skirt at its periphery, the inner wall of the skirt including a thread to cooperate with a complementary thread arranged on an end portion of the external wall of the hollow tube.

1.3. The Body 1.3.1. Processing Unit

The body 13 comprises a processing unit such as an electronic card:

for detecting the presence of metallic parts as a function of signals measured by the inductive transducer 21, and sending an alert control to an alarm of the detector.

The body 13 comprises a processing unit such as an electronic card:

for detecting the presence of metallic parts as a function of signals measured by the inductive transducer 21, and sending an alert control to an alarm of the detector.

The processing unit comprises a controller programmed to control the standby function of the portable detector according to certain criteria to be described in more detail hereinbelow.

The controller is for example a microcontroller, a processor, or a microprocessor.

Preferably, the controller is coupled to a memory of the detector for registering configuration data of the standby function and other functions of the detector.

The processing unit also comprises a sensor such as a three-axle accelerometer for measuring:

displacement of the detector, and orientation of the detector.

The position sensors formed by a three-axle accelerometer are known per se and therefore will not be described in more detail hereinbelow.

1.3.2 Alarm

The body 13 also comprises the alarm to which the alert control is sent by the processing unit.

This alarm can comprise:

a vibrator to vibrate the detector when metal is detected, and/or a light-emitting diode to illuminate all or part of the detector when metal is detected, and/or a baffle to emit a sound when metal is detected.

1.3.3. Entry Means

The body 13 finally comprises entry means for setup the detector, and more precisely functionalities of the detector.

The entry means can be a keypad, a touch screen, or any other type of entry means known to those skilled in the art.

In the embodiment illustrated in FIG. 1, the entry means comprise seven keys 131-137:

a first key 131 located in a lower portion of the keypad lights up and extinguishes the detector 1, second 132, third 133 and fourth 134 keys located above the first key 131 for adjusting the detection sensitivity between low detection sensitivity, average detection sensitivity and high detection sensitivity, fifth 135 and sixth 136 keys located above the second, third and fourth keys 132-134 for respectively switched on or switched off the associated audio alert functionality and the vibratory alert functionality, a seventh key 137 for switched on or switched off the light alert functionality.

2. Standby Function of the Detector

As indicated earlier, the controller 20 is programmed to control activation or deactivation of the standby function of the portable detector 1.

The activation or the deactivation of the standby function depends on the signals received from the transducer 21 and the sensor 22.

More precisely, the controller 20 is connected to the sensor 22 on the one hand, and to the inductive transducer 21 on the other hand. This allows the transducer 21 and the sensor 22 to transmit signals which they measure to the controller 20. If these received signals satisfy certain criteria, the controller 20 controls activation or deactivation of the Standby Function 2.1. Activation of the Standby Function Activation of the standby function by the controller is based on a certain number of conditions. If these conditions are satisfied, the controller 20 controls activation of the standby function of the detector 1.

These conditions depend on the measurements made by the sensor 22 and the inductive transducer 21.

For example in an embodiment the standby function of the detector 1 is activated if over a predetermined time period:
- amplitude of the electromagnetic field (measured by the inductive transducer 21) is constant,
- orientation of the detector (measured by the sensor 22) is constant, and
- displacement of the detector (measured by the sensor 22) is zero.

When the three above criteria must be satisfied to activate the standby function, the predetermined time period can be fairly short, for example of the order of ten seconds. In fact during examination of a person to be controlled, it is barely probable that the operator holds the detector 1 immobile for longer than ten seconds. Of course, the predetermined time period can be greater than ten seconds.

To further limit the risks of untimely standby of the detector 1, the criterion relative to orientation can be more precise. In particular, the condition on the orientation of the detector 1 can be considered as satisfied only when the detector 1 is in a horizontal position for the predetermined time period. This further limits the risk of activation of the standby function during examination of a person to be checked. In fact, the detector is generally used in a vertical position during examination, the detector being oriented horizontally only to scan the top of the shoulders of the individual to be inspected.

In another embodiment, the standby function of the detector is activated if over a predetermined time period:
- amplitude of the signal measured by the inductive transducer 21 is constant, and
- orientation of the detector measured by the accelerometer is constant.

In this case, the predetermined time period can be made longer—for example forty seconds—to prevent the detector monitoring during examination of a person to be controlled.

In all cases, when the activation criteria of the standby function are satisfied, the controller 20 controls activation of the standby function.

The transducer 21 is no longer fed by the battery of the detector 1. So, the transducer 21 is no longer emitting a magnetic field. This limits the energy consumption of the detector.

On the contrary, the controller 20 and the sensor 22 stay fed by the battery of the detector 1. In fact, deactivation of the standby function by the controller 20 depends on the signals from the sensor 22.

2.2. Deactivation of the Standby Function

Deactivation of the standby function by the controller 20 is based on one or more conditions to be verified by measurements taken by the sensor 22. These conditions can be cumulative or alternative.

For example in an embodiment the standby function of the detector 1 is deactivated if:
- orientation of the detector (measured by the sensor 22) varies, and/or
- displacement of the detector (measured by the sensor 22) is non-zero.

Of course, deactivation of the standby function can depend on just one of these conditions in some embodiments.

In all cases, when the deactivation criteria are satisfied, the controller 20 controls deactivation of the standby function. The transducer 21 is again fed by the battery of the detector 1 and shifts to an active emission state of a magnetic field.

2.3. Operating Principle

The operating principle of the detector 1 will now be described in more detail in reference to FIG. 3.

During examination of a person to be checked, the operator utilises the detector 1 to examine a person to be checked. He moves the detector close to the body of the person to be checked to sweep the entire surface of the latter.

The processing unit and the controller 20 receive the signals coming from the transducer 21 and the sensor 22.

If the person is carrying any metal, the processing unit sends an alert control to the alarm of the detector 1: the detector 1 vibrates and/or emits an audio signal and/or emits a light signal. In not, no alert control is sent by the processing unit.

Once the person has been examined, the operator places the detector 1 on a horizontal plane which can be metallic or not. If the horizontal plane is metallic, the processing unit sends an alert control to the alarm of the detector 1 which vibrates and/or sounds and/or lights up.

At the same time, the controller 20 receives (step 30) the signals coming from the transducer 21 and the sensor 22. The controller 20 verifies (step 31) whether the activation criteria of the standby function of the detector 1 are satisfied.

If during the predetermined time period (10 seconds for example):
- amplitude of the field electromagnetic (measured by the inductive transducer 21) is constant,
- orientation of the detector (measured by the sensor 22) is horizontal, and
- displacement of the detector (measured by the sensor 22) is zero, the controller (20) then controls activation of the standby function (step 32).

The detector stops vibrating and/or sounding and/lighting up and the power feed of the transducer 21 is cut.

Once the detector 1 is on standby, the transducer 21 no longer generates a magnetic field, limiting the risk of perturbations and electromagnetic interference generated by the detector. Also, the electrical energy consumed by the detector is reduced, the transducer 21 no longer being fed with power.

As another person to be checked passes through, the operator grips the detector 1. This causes setting in motion of the detector 1 and a change in its orientation. The signals measured by the sensor 22 with respect to orientation and displacement of the detector are sent to the controller 20 (step 33) which detects the change in orientation of the detector and/or its displacement (step 34). More precisely, the controller verifies that one (at least) of the following conditions is verified:
- the displacement value of the detector varies over a given time interval, and/or
- the orientation value of the signal measured by the sensor varies over the given time interval.

Of course, the duration of the time interval can be different to the duration of the predetermined time period. For example, the duration of the time interval can be of the order of a second or a millisecond as a function of the measuring frequency of the sensor 22.

The controller controls deactivation of the standby function (step 35). The transducer 21 is resupplied with power and the detector 1 can be used to examine the person to be checked.

The reader will have understood that many modifications can be made to the detector described hereinabove without departing materially from the ideas of the present document. This why such modifications are included within the scope of the following claims.

The invention claimed is:

1. A portable detector for metal detection, the detector including:
   a head extending longitudinally and comprising an inductive transducer for generating a magnetic field and measuring a variation in inductance,
   a body including a controller programmed to control the activation or the deactivation of a standby function of the detector, and
   a sensor for measuring one or more of the displacement of the detector or the orientation of the detector,
   wherein the controller activates the standby function if the following conditions are verified:
      an amplitude of a signal measured by the inductive transducer is constant over a predetermined time period and
      a displacement value of a signal measured by the sensor is zero or an orientation value of a signal measured by the sensor is constant.

2. The detector according to claim 1, wherein the controller activates the standby function if the following conditions are also verified:
   a displacement value of a signal measured by the sensor is zero and
   an orientation value of a signal measured by the sensor is constant.

3. The detector according to claim 2, wherein the controller activates the standby function if the following condition is also verified:
   the orientation value is such that the head of the detector extends in a horizontal plane.

4. The detector according to claim 1, wherein the controller activates the standby function if the following condition is also verified:
   the orientation value is such that the head of the detector extends in a horizontal plane.

5. The detector according to claim 1, wherein the sensor is a three-axle accelerometer.

6. The detector according to claim 1, wherein the controller deactivates the standby function as a function of one or more signals received from the sensor.

7. The detector according to claim 6, wherein the controller deactivates the standby function if at least one of the following conditions are verified:
   the a displacement value of the detector varies over a given time interval or
   the an orientation value of a signal measured by the sensor varies over the given time interval.

8. The detector according to claim 6, wherein the controller deactivates the standby function if an orientation value of a signal measured by the sensor is different from an orientation reference value in which the head of the detector extends in a horizontal plane.

9. A portable detector for metal detection, the detector including:
   a head extending longitudinally and comprising an inductive transducer for generating a magnetic field and measuring a variation in inductance,
   a body including a controller programmed to control the activation or the deactivation of a standby function of the detector, and
   a sensor for measuring one or more of the displacement of the detector or the orientation of the detector,
   wherein the controller activates the standby function if the following conditions are verified:
      an amplitude of a signal measured by the inductive transducer is constant over a predetermined time period and
      an orientation value of a signal measured by the sensor is such that the head of the detector extends in a horizontal plane.

10. The detector according to claim 9, wherein the controller activates the standby function if the following condition is also verified:
    a displacement value of a signal measured by the sensor is zero.

11. The detector according to claim 9, wherein the controller activates the standby function if the following condition is also verified:
    the orientation value of the signal measured by the sensor is constant.

12. The detector according to claim 9, wherein the controller activates the standby function if the following conditions are also verified:
    a displacement value of a signal measured by the sensor is zero and
    the orientation value of the signal measured by the sensor is constant.

13. The detector according to claim 9, wherein the controller deactivates the standby function if the following conditions are verified:
    a displacement value of the detector varies over a given time interval and
    an orientation value of a signal measured by the sensor varies over the given time interval.

14. The detector according to claim 9, wherein the controller deactivates the standby function if an orientation value of a signal measured by the sensor is different from an orientation reference value in which the head of the detector extends in a horizontal plane.

15. A portable detector for metal detection, the detector including:
    a head extending longitudinally and comprising an inductive transducer for generating a magnetic field and measuring a variation in inductance,
    a body including a controller programmed to control the activation or the deactivation of a standby function of the detector, and
    a sensor for measuring one or more of the displacement of the detector or the orientation of the detector,
    wherein the controller activates the standby function if the following condition is verified:
       an amplitude of a signal measured by the inductive transducer is constant over a predetermined time period, and
    wherein the controller deactivates the standby function if an orientation value of a signal measured by the sensor is different from an orientation reference value in which the head of the detector extends in a horizontal plane.

16. The detector according to claim 15, wherein the controller activates the standby function if the following condition is also verified:

a displacement value of a signal measured by the sensor is zero.

17. The detector according to claim 15, wherein the controller activates the standby function if the following condition is also verified:
   an orientation value of a signal measured by the sensor is constant.

18. The detector according to claim 15, wherein the controller activates the standby function if the following conditions are also verified:
   a displacement value of a signal measured by the sensor is zero and
   an orientation value of a signal measured by the sensor is constant.

19. The detector according to claim 15, wherein the controller deactivates the standby function if the following condition is also verified:
   a displacement value of the detector varies over a given time interval.

20. The detector according to claim 19, wherein the controller deactivates the standby function if the following condition is also verified:
   the orientation value of the signal measured by the sensor varies over the given time interval.

* * * * *